(12) United States Patent
Kang (10) Patent No.: US 6,822,646 B2
(45) Date of Patent: Nov. 23, 2004

(54) DISPLAY APPARATUS WITH POWER SUPPLY HAVING A POWER SAVING MODE

(75) Inventor: Ho-woong Kang, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 10/166,644

(22) Filed: Jun. 12, 2002

(65) Prior Publication Data

US 2003/0076316 A1 Apr. 24, 2003

(30) Foreign Application Priority Data

Oct. 20, 2001 (KR) ........................................ 2001-64910

(51) Int. Cl.[7] ................................................ G09G 5/00
(52) U.S. Cl. ........................ 345/212; 363/20; 327/143; 345/213
(58) Field of Search .............................. 345/204, 211, 345/212, 213; 327/143, 144, 541, 544; 307/31; 363/97, 95, 20, 21.15

(56) References Cited

U.S. PATENT DOCUMENTS

| | | | | |
|---|---|---|---|---|
| 5,532,577 A | * | 7/1996 | Doluca ........................ | 323/282 |
| 6,009,005 A | * | 12/1999 | Kim ............................ | 363/95 |
| 6,020,781 A | * | 2/2000 | Fujioka ...................... | 327/541 |
| 6,044,002 A | * | 3/2000 | Van Der Wal et al. ........ | 363/97 |
| 6,057,607 A | * | 5/2000 | Rader et al. .................. | 307/11 |
| 6,369,643 B1 | * | 4/2002 | Lee et al. .................... | 327/544 |
| 6,744,149 B1 | * | 6/2004 | Karuppana et al. ........... | 307/31 |

* cited by examiner

*Primary Examiner*—Kent Chang
(74) *Attorney, Agent, or Firm*—Staas & Halsey LLP (57) ABSTRACT

A display apparatus includes a power supply comprising a commercial AC power supplying part, a transformer having a primary coil and a secondary coil and supplying an AC voltage to driving circuits, and a feedback voltage sensing part sensing a load of the secondary coil. The power supply further includes a power mode information part outputting information for determining a normal mode or a power saving mode according to an input of a synchronous signal. The power supply also includes a power driving part including a power driver generating a power regulating signal according to a synchronous signal on the basis of a feedback voltage sensed by the feedback voltage sensing part at the normal mode, and an idle power driver generating a power saving voltage on the basis of a synchronous signal which is made by synthesizing different frequency signals at the power saving mode; an idle switching part turning on/off the idle power driver. In addition, the power supply includes a control part cutting off the feedback voltage applied to the power driver and controlling the idle switching part so as to operate the idle power driver in the power saving mode. In the power saving mode, power consumption is minimized by driving a power driving part with a synthetic synchronous signal, securing a stable operation of a control part and the power driving part.

25 Claims, 6 Drawing Sheets

DISPLAY APPARATUS WITH POWER SUPPLY HAVING A POWER SAVING MODE

CROSS-REFERENCE TO RELATED APPLICATIONS

This application claims the benefit of Korean Application No. 2001-64910, filed Oct. 20, 2001, in the Korean Patent Office, the disclosure of which is incorporated herein by reference.

BACKGROUND OF THE INVENTION

1. Field of the Invention

The present invention relates, generally, to a display apparatus, and more particularly, to a display apparatus having a power supply capable of lowering power consumption effectively in a power saving mode.

2. Description of the Related Art

Generally, in a display apparatus, a power supply supplies electric power to components such as a deflection circuit, a high voltage circuit, etc., respectively. Recently, technology related to an SMPS (Switched Mode Power Supply) has been rapidly developing. An SMPS is small, light and effective compared to a linear power supply.

Figure 5:
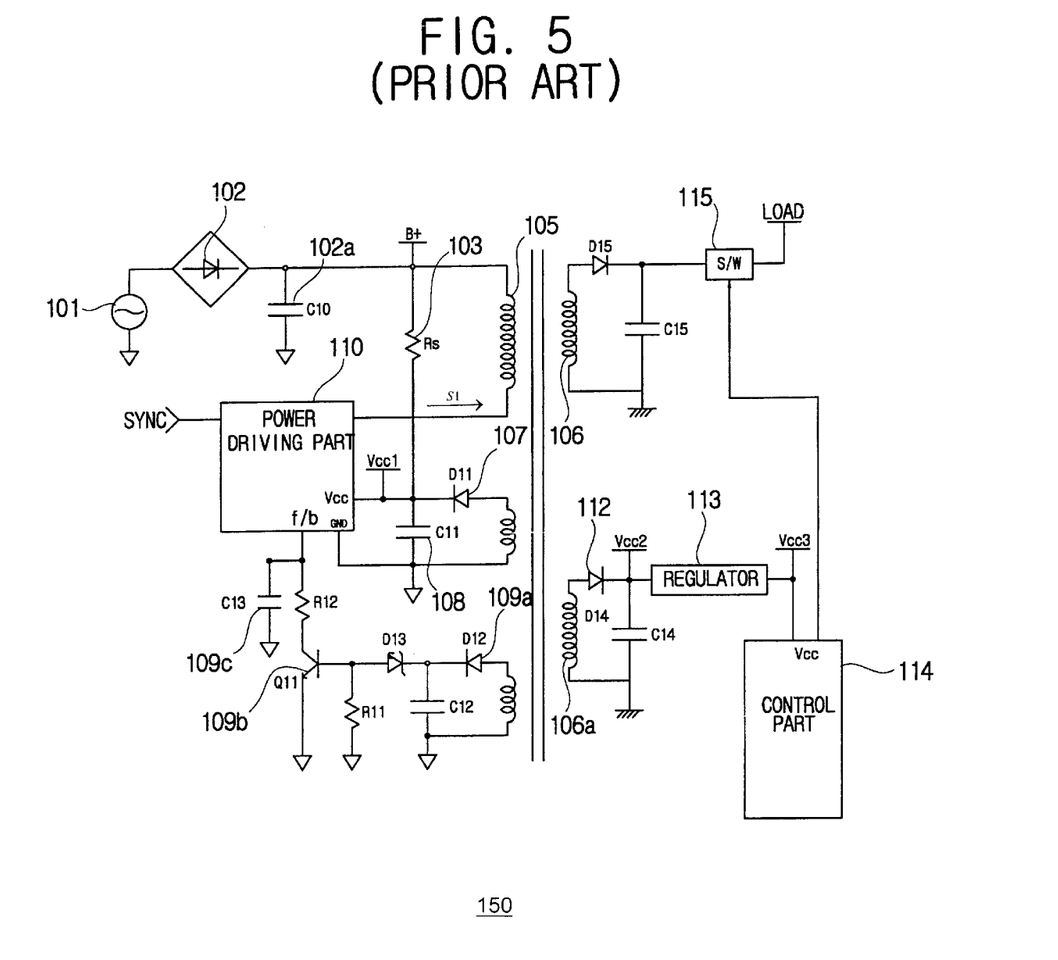
FIG. 5 is a circuit diagram of a power supply of a conventional display apparatus.

A conventional SMPS 150, as shown in FIG. 5, comprises a power supplying part 101, a transformer (105, 105a, 105b, 106 and 106a), a feedback voltage sensing part 109 sensing a voltage applied to a secondary coil 106, and a power driving part 110 supplying a square wave AC (Alternating Current) voltage to a primary coil 105 on the basis of a synchronous signal applied from a video card (not shown).

Referring to FIG. 5, an operation of the SMPS 150 is described hereinbelow. First, commercial AC power of 110V or 220V is supplied to the SMPS 150 by the power supplying part 101. The commercial AC power is converted into a DC (Direct Current) voltage "B+" through a rectifier 102 and a capacitor 102a. The DC voltage "B+" generates a starting current based on a starting resistor 103, so as to operate the power driving part 110. As the power driving part 110 is operated, a PWM (Pulse Width Modulation) control signal S1 is applied to the primary coil 105. The PWM control signal S1 is generated from a power driver (to be described later) provided inside the power driving part 110. Further, the PWM control signal S1 generates an AC voltage in the primary coil 105, and therefore an AC voltage is induced in the secondary coils 106 and 106a and supplied to driving circuits (not shown) inside a display apparatus. The induced AC voltage of the secondary coil 106a goes through a diode 112 and is stabilized by a regulator 113, thus being applied to a control part 114.

Figure 6:
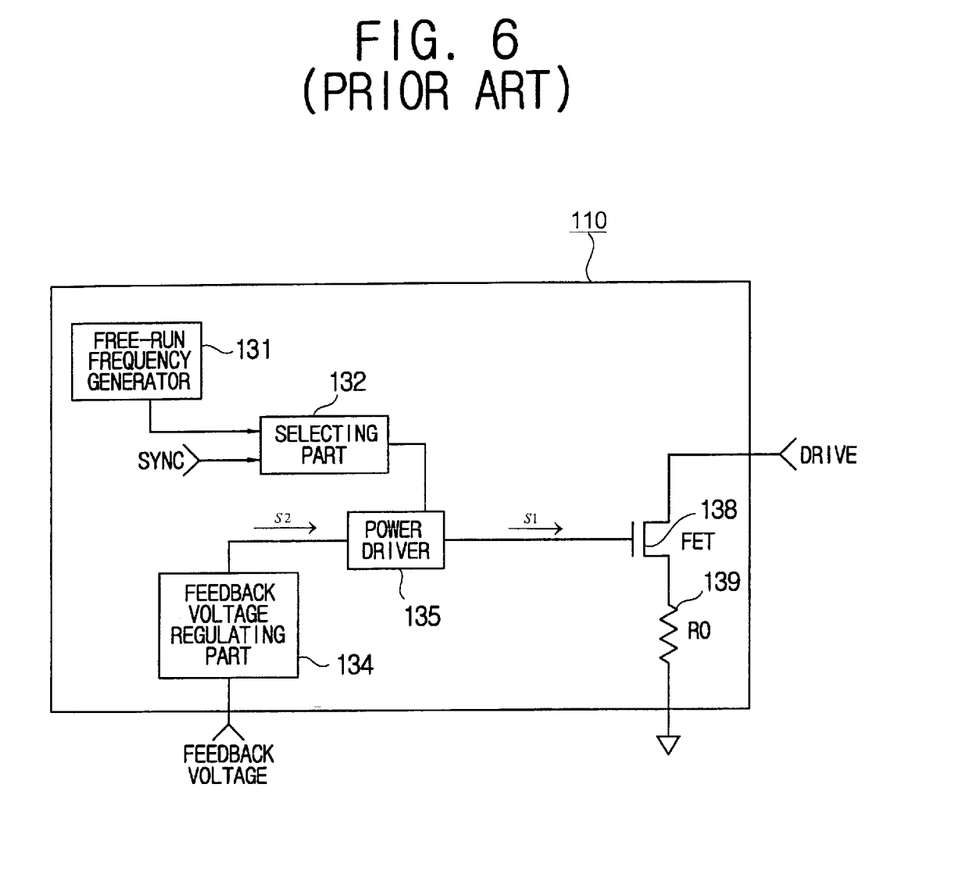
FIG. 6 is a block diagram showing an inside circuit of a power driving part of FIG. 5.

Referring to FIG. 6, the power driving part 110 includes a free-run frequency generator 131 generating a synchronous signal by itself in a power saving mode in which the synchronous signal is not received from a video card (not shown) The power driving part 110 also includes a selecting part 132 selecting one of the synchronous signal received from the video card (not shown) in normal mode, and the synchronous signal received from the free-run frequency generator 131 in the power saving mode. In addition, the power driving part 110 includes a power driver 135 outputting the PWM control signal S1 in response to the synchronous signal, a power transistor 138 which is switched on/off according to the PWM control signal S1 outputted from the power driver 135, and a feedback voltage regulating part 134 transmitting a voltage-regulating signal S2 to the power driver 135. The duty ratio of the voltage-regulating signal S2 is regulated by comparing a feedback voltage with an output voltage of the power transistor 138 The drain of the power transistor 138 is coupled to drive, and the source of the power transistor 138 is coupled to resistor 139.

Referring again to FIG. 5, in the power saving mode, the control part 114 cuts off the output of the secondary coil 106 supplied to each driving circuit by switching off a load connection switch 115, thus lowering power consumption. Accordingly, as the output of the secondary coil 106 is cut off from the other components, the load thereof is decreased and the feedback voltage is reduced. On the basis of the reduced feedback voltage, the feedback voltage regulating part 134 of the power driving part 110 transmits the voltage-regulating signal S2 to the power driver 135. Then, the power driver 135 transmits the PWM control signal S1 to the power transistor 138 in response to the synchronous signal generated from the free-run frequency generator 131. According to the PWM control signal S1, the power transistor 138 is switched on/off, and thus an AC voltage is supplied to the primary coil 105. At this time, the control part 114 and the power driving part 110 consume 0.2 Watt and 1 Watt or more, respectively, of power. Furthermore, because power consumption due to a leakage current at the starting resistor 103 is added to the above power consumption, total power consumption is at least 2 Watts or more.

Thus, in order to lower the power consumption in the power saving mode, lowering the power consumption of the power driving part 110 is effective because the power consumption of the power driving part 110 is relatively higher than that of the control part 114. As a method for lowering the power consumption of the power driving part 110 in the power saving mode, there is proposed a method of lowering the frequency of the free-run frequency generator 131 and increasing the resistance of the starting resistor 103.

However, if the frequency of the free-run frequency generator 131 is lowered, the transformer makes a noise. Further, if the resistance of the starting resistor 103 is increased, the starting current is decreased and the minimum on-duty of the PWM control signal for driving the transformer is not secured. Accordingly, the output voltage of the transformer is unstable, thus making the operations of the power driving part 110 and the control part 114 unstable.

SUMMARY OF THE INVENTION

Accordingly, the present invention has been made keeping in mind the above-described shortcomings and user's need.

An aspect of the present invention is to provide a display apparatus having a power supply minimizing power consumption at a power saving mode by operating a power driving part with a synthetic synchronous signal, securing stable operations of a control part and the power driving part.

This and other aspects of the present invention are accomplished by a display apparatus of the present invention. The display apparatus of the present invention inlcudes a power supply comprising a commercial AC power supplying part, a transformer having a primary coil and a secondary coil and supplying an AC voltage to driving circuits, and a feedback voltage sensing part sensing a load of the secondary coil. The power supply of the display apparatus of the present invention also comprises a power mode information part providing information for determining a normal mode or a power saving mode according to an input of a synchronous signal; a power driving part including a power driver generating a power regulating signal according to a synchronous signal on the basis of a feedback voltage sensed by the feedback voltage sensing part in the normal mode, and an idle power driver generating a power saving voltage on the basis of a synchronous signal which is made by synthesizing different frequency signals in the power saving mode; an idle switching part turning on/off the idle power driver; and a control part cutting off the feedback voltage applied to the power driver and controlling the idle switching part so as to operate the idle power driver in the power saving mode.

The power driving part includes a power transistor connected to the primary coil, and the idle power driver includes a plurality of sawtooth generators respectively generating sawtooth signals with several tens of hertz (Hz) and several tens of kilohertz (KHz), a plurality of comparators processing the sawtooth signals and outputting square wave signals having different pulse widths, and an AND gate logically synthesizing the square wave signals outputted from the comparators and supplying the synthetic square wave signal to the power transistor.

The display apparatus further comprises an OR gate provided between the power driver and the power transistor, logically OR-ing output signals of the power driver and the idle power driver, and supplying the result to the power transistor.

The sawtooth generator generating the sawtooth signal of several tens of hertz (Hz) is driven on the basis of the DC voltage of the primary coil, and the sawtooth generator generating sawtooth signal of several tens of kilohertz (KHz) is driven on the basis of the driving voltage of the power driving part.

The power driving part further includes an inverter provided between the power driver and the AND gate so as to suspend the operation of the idle power driver in the normal mode, and the power driving part outputs a power-saving off signal to the AND gate through the inverter when the power saving mode changes to the normal mode.

The idle switching part includes a photocoupler and a power-saving off transistor turned on together with the photocoupler and cutting off the DC voltage supplied to the comparator receiving the several tens of hertz (Hz) sawtooth signal.

The power driving part further includes a feedback voltage regulating part transmitting a feedback regulating signal after comparing a voltage sensed by a sensing resistor with a feedback voltage sensed by the feedback voltage sensing part, and the idle switching part further includes a feedback-cutoff transistor operating contrary to the power-saving off transistor and cutting on/off the feedback voltage supplied to the feedback voltage regulating part.

The control part outputs a load-off signal switching off a connection between the secondary coil and each driving circuit after operating the idle switching part after a predetermined time lapse at the beginning of the power saving mode.

The control part turns off the idle switching part after connecting the secondary coil with each driving circuit when the power saving mode changes to the normal mode.

The power mode information part includes a video card turning on/off the synchronous signal applied to the power driver according to the normal mode or the power saving mode.

Moreover, the present invention comprises a power supply for a display apparatus. The power supply of the present invention comprises a power driving part receiving a synchronous signal. The power driving part comprises a power driver generating a power regulating signal according to a synchronous signal on the basis of a feedback voltage sensed by a feedback voltage sensing part in the normal mode; and an idle power driver generating a power saving voltage on the basis of a synchronous signal which is made by synthesizing different frequency signals in the power saving mode. The power supply of the present invention further comprises an idle switching part, coupled to the power driving part, turning on/off the idle power driver. In addition, the power supply of the present invention comprises a control part, coupled to the idle switching part, cutting off the feedback voltage applied to the power driver and controlling the idle switching part so as to operate the idle power driver in the power saving mode.

Moreover, the present invention comprises a method of a power supply for a display apparatus. The method of the present invention comprises receiving by a power driving part a synchronous signal, generating by a power driver a power regulating signal according to a synchronous signal on the basis of a feedback voltage sensed by a feedback voltage sensing part in a normal mode, cutting off the feedback voltage applied to the power driver in the power saving mode, and generating a power saving voltage on the basis of a synchronous signal which is made by synthesizing different frequency signals in the power saving mode.

Additional objects and advantages of the invention will be set forth in part in the description which follows and, in part, will be obvious from the description, or may be learned by practice of the invention.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENT

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
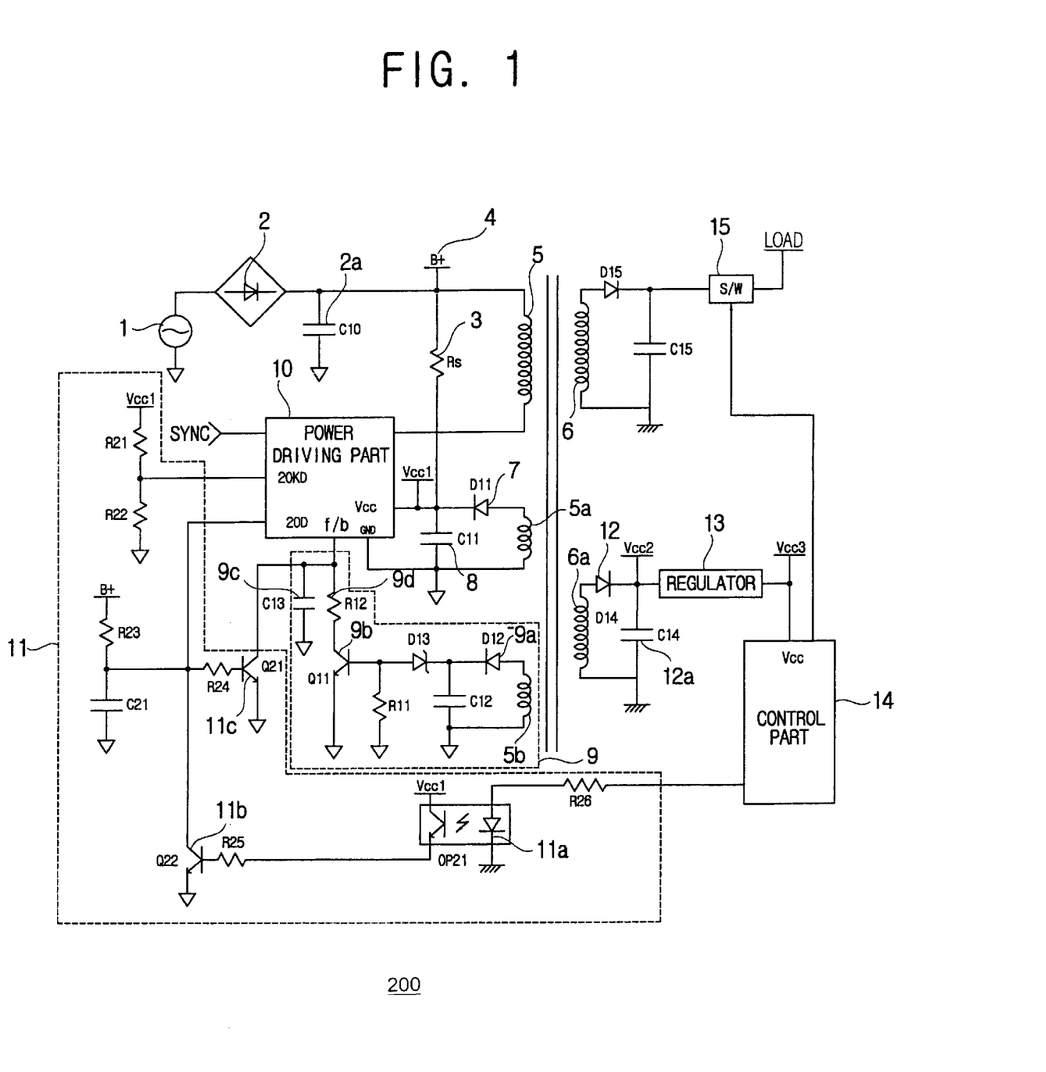
FIG. 1 is a circuit diagram of a power supply of a display apparatus according to the present invention.
Figure 2:
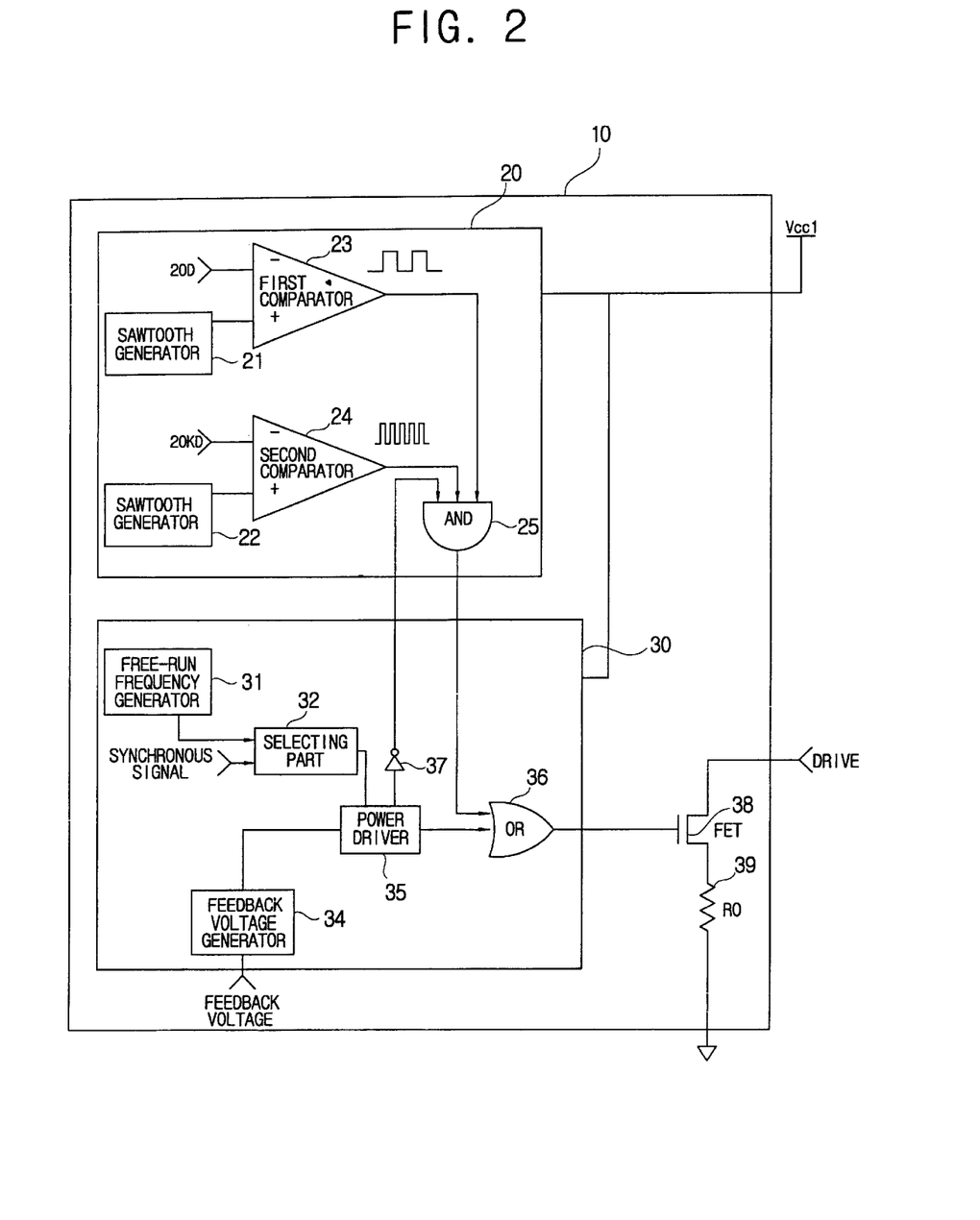
FIG. 2 is a block diagram showing an inside circuit of a power driving part of FIG. 1.

FIG. 1 is a circuit diagram of a power supply 200 of a display apparatus according to the present invention, and FIG. 2 is a block diagram showing an inner circuit of a power driving part 10 of FIG. 1.

As shown in FIG. 1, the power supply 200 of the display apparatus comprises a commercial AC power supplying part 1, a DC converting part having a rectifier 2 and a capacitor 2a, a transformer having primary coils 5, 5a and 5b and secondary coils 6 and 6a and supplying an AC voltage to driving circuits, a feedback voltage sensing part 9 sensing an output voltage of the transformer, a power mode information part, namely, a video card (not shown) whose synchronous signal is used as information for determining a power mode, a power driving part 10 supplying a square wave AC voltage to the primary coil 5 on the basis of a synchronous signal received from a video card (not shown), a control part 14 being operated by a voltage of the secondary coil 6a induced by the AC voltage applied to the primary coil 5, and a load connection switch 15 switching on/off a connection between the secondary coil 6 and each driving circuit by a control signal of the control part 14 in a power saving mode.

The power driving part 10 and peripheral circuits operate as follows. When commercial AC power is supplied to the power supply 200 by the commercial AC power supplying part 1, the rectifier 2 and the capacitor 2a convert the applied commercial Ac power into a DC voltage "B+", and thus a starting current flows through a starting resistor 3. Then, a capacitor 8 connected to the power driving part 10 is charged by the starting current, and a charging voltage "Vcc1" drives the power driving part 10, so that the power driving part 10 outputs square wave AC voltage. Accordingly, as the square wave AC voltage of the power driving part 10 is supplied to the primary coils 5 and 5a of the transformer, an AC voltage is induced in the secondary coils 6 and 6a and supplied to the control part 14 and each driving circuit (not shown). Further, the induced AC voltage of the secondary coil 6a goes through a diode 12 and is charged in the capacitor 12a. The charging voltage "Vcc2" is stabilized by a regulator 13 and applied to the control part 14.

The feedback voltage sensing part 9 includes a capacitor C12 connected in parallel to the primary coil 5b, a resistor 9d, a transistor 9b, and a capacitor 9c connected to a feedback input terminal "f/b" of the power driving part 10, and is operated by a charging voltage which is charged in the capacitor 9c when the commercial AC power is supplied thereto. The charging voltage of the capacitor 9c is discharged by grounding the resistor 9d when the transistor 9b is turned on by a voltage of the primary coil 5b induced by an electric current applied to the secondary coils 6 and 6a depending on the load that is, the (driving circuits). In FIG. 1, the discharging amount of the capacitor 9c is determined according to the amount of the electric current flowing through the secondary coils 6 and 6a, and a remaining voltage of the capacitor 9c is applied to the power driving part 10 as a feedback voltage.

Further, to an idle power driver 20 (to be described later) with reference to FIG. 2, which is provided inside the power driving part 10, are supplied a voltage divided from the driving voltage "Vcc1" of the power driving part 10 by resistors R21 and R22, and a voltage divided from the voltage "B+" by resistors R23 and R24.

As shown in FIG. 2, the inside circuit of the power driving part 10 comprises a normal power driver 30 and the idle power driver 20.

The normal power driver 30 includes a free-run frequency generator 31 generating a synchronous signal by itself in the power saving mode in which the synchronous signal is not applied from the outside, a selecting part 32 selecting the synchronous signal depending upon whether a normal mode or the power saving mode being in force, and the power driver 35 outputting a square wave control signal in response to the synchronous signal.

The power driving part 10 further comprises of a power transistor 38 which is switched on/off according to the square wave control signal outputted from the normal power driver 30 and the idle power driver 20, thus applying an AC signal to the primary coil 5, a sensing resistor 39 connected to a source terminal for sensing a source voltage of the power transistor 38, and a feedback voltage regulating part 34 outputting a feedback control signal. The feedback voltage regulating part 34 compares a feedback voltage applied to the feedback input terminal "f/b" with the voltage sensed by the sensing resistor 39 of the power transistor 38, regulates a duty ratio of the feedback control signal, and supplies the feedback control signal to the power driver 35.

The normal power driver 30 further includes an inverter 37 outputting a suspending signal which suspends the idle power driver 20 in the normal mode, and an OR gate 36 provided between the power driver 35 and the power transistor 38, logically OR-ing output signals of the power driver 35 and idle power driver 20, and supplying the result to the power transistor 38.

The idle power driver 20 includes sawtooth generators 21 and 22 respectively generating sawtooth signals of 20 Hz and 20 KHz, first and second comparators 23 and 24 each receiving a sawtooth signal and outputting square wave signals, and an AND gate 25 determining the logical product of the square wave signals of 20 KHz and 20 Hz outputted from the first and second comparators 23 and 24, and supplying the result to the OR gate 36 of the normal power driver 30. First comparator 23 also receives input 20D, and second comparator 24 receives input 20KD, which are explained with reference to FIG. 3.

In FIG. 2, the idle power driver 20 is operated by the voltage divided from the driving voltage "Vcc1" of the power driving part 10 by the resistors R21 and R22, and the voltage divided from the voltage "B+" by the resistors R23 and R24. Therefore, the width of the square wave signal outputted from the second comparator 24 varies according to the variation of DC voltage "B+" based on the commercial AC power of 110V or 220V.

Referring to FIG. 1, between the power driving part 10 and the control part 14 is provided an idle switching part 11 turning on/off the power driving part 10. The idle switching part 11 includes a photocoupler 11a comprising a diode and a transistor, a power-saving off transistor 11b simultaneously turned on when the photocoupler 11a is turned on and cutting off the DC voltage applied to the first comparator 23, and a feedback-cutoff transistor 11c operating opposite to the power-saving off transistor 11b and suspending a feedback operation by dropping the feedback voltage into 0V at the power saving mode.

Figure 3:
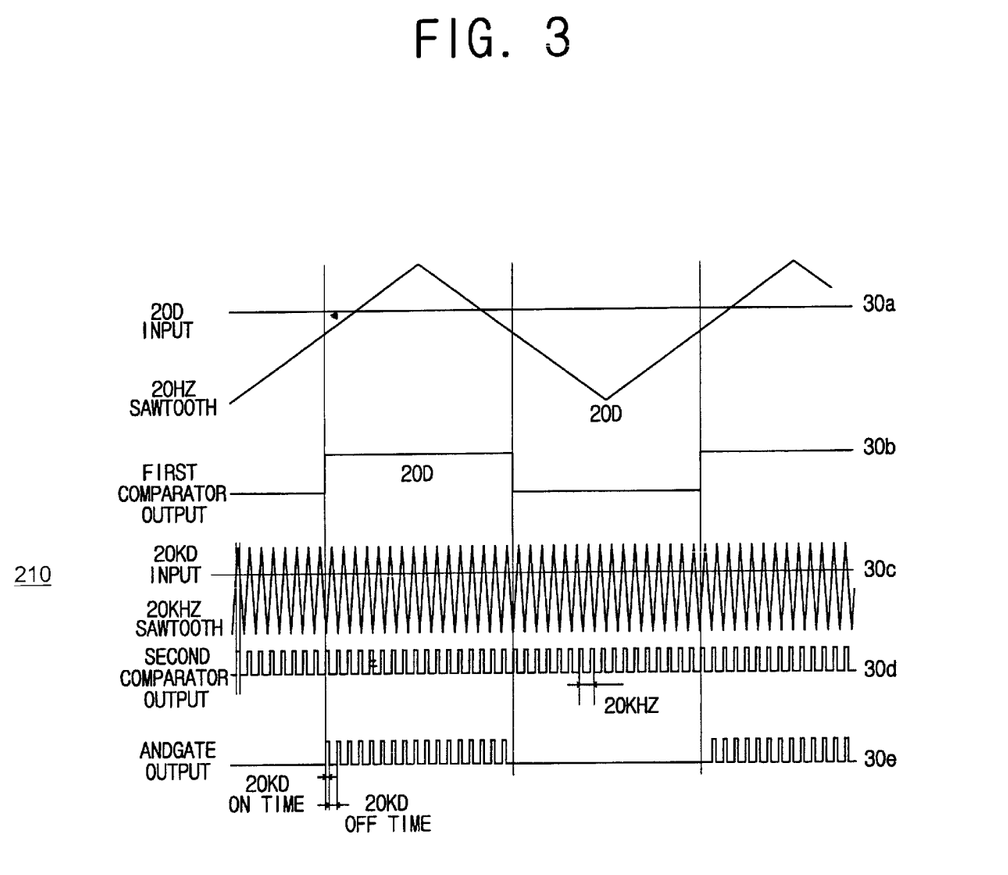
FIG. 3 shows signal waveforms of blocks of an idle power driver of FIG. 2.

FIG. 3 shows signal waveforms 210 of blocks of an idle power driver 20 of FIG. 2. As shown in FIG. 3, the first comparator 23 receives the sawtooth signal 30a (20 Hz) as input 20D and outputs the square wave signal 30b (20 Hz) by comparing the sawtooth signal with the voltage divided from the driving voltage "Vcc1" of the power driving part 10. The second comparator 24 receives the sawtooth signal 30c (20 KHz) as input 20KD and outputs the square wave signal 30d (20 KHz) on the basis of the DC voltage "B+" of the primary coil 5. The AND gate 25 connected to the first and second comparators 23 and 24 determines a logical product of the square wave signals 30b and 30d outputted therefrom, thus outputting the synthetic square wave signal 30e. As a result, the power supply can avoid an audible frequency causing the transformer to make a noise when the power transistor 38 is driven by the signals outputted from the idle power driver 20 by the synthesized signal.

Figure 4:
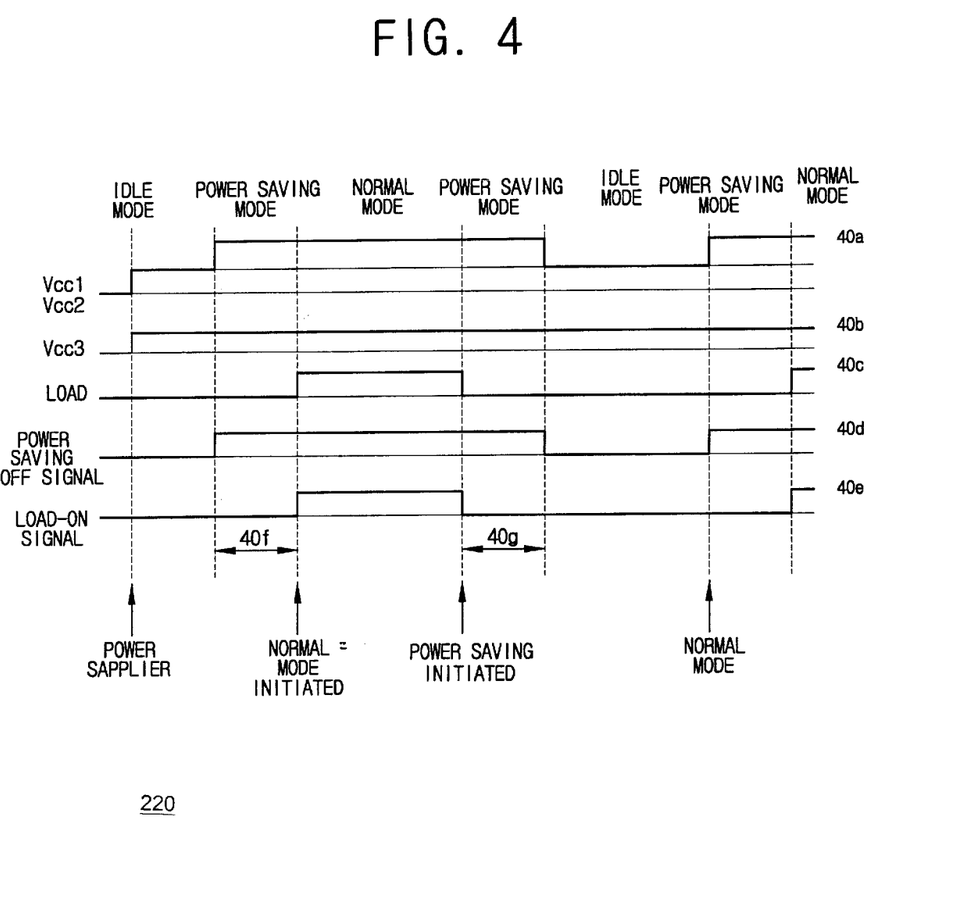
FIG. 4 shows waveforms of voltage and control signals of output lines of FIG. 1.

The relationship 220 among the control signals of the control part 14 and the signals outputted from the secondary coil 6 and the power driving part 10, which minimizes the power consumption, will be described hereinbelow referring to FIG. 4. As shown in FIG. 4, accordingly as the commercial AC power is supplied to each driving circuit, voltages thereof "Vcc1" (40a), "Vcc2" (40a) and "Vcc3" (40a) are boosted, thus turning on the display apparatus, to progress sequentially through an idle mode, the power saving mode and the normal mode.

In changing from the idle mode into the power saving mode, the power driving part 10 and the control part 14 operate as follows. Accordingly as the capacitor 2a is charged with the commercial AC power, the starting current is applied to the capacitor 8 for driving the power driving part 10 through the starting resistor 3. Then, the voltage "Vcc1" of the capacitor 8 is boosted, thus supplying a current to the power driving part 10. At this time, the feedback-cutoff transistor 11c is turned on by the "B+" voltage.

Accordingly as the power driving part 10 is operated, voltages divided from the voltages "Vcc1" and "B+" are applied to the idle power driver 20. At this time, the idle power driver 20 outputs the synthetic square wave signals (20 Hz, 20 KHz), and the synthetic square wave signals switch on/off the power transistor 38, thus generating an AC voltage signal to be applied to the primary coil 5. The AC voltage signal of the primary coil 5 induces an AC voltage signal in the secondary coil 6, and the AC voltage of the secondary coil 6 is charged in the capacitor 12a through the diode 12, so that the voltage of the capacitor 12a is supplied to the control part 14 through the regulator 13, thus driving the control part 14.

In changing from the idle mode into the power saving mode, the voltage "Vcc1" driving the power driving part 10 and the charging voltage "Vcc2" of the capacitor 12a are identically changed (40a), and the control part 14 applies a power-saving off signal to the idle power switching part 11, thus driving the photocoupler 11a. According as the photocoupler 11a operates, the power-saving off transistor 11b is turned on and the feedback-cutoff transistor 11c is turned off, thereby dropping the voltage supplied to the first comparator 23 of the idle power driver 20 into 0V. Then, on-duty of the square wave signal (20 Hz) outputted from the first comparator 23 is prolonged. Accordingly, on-duty of the square wave signal outputted from the AND gate 25 is prolonged, so that the voltage "Vcc1" of the power driving part 10 and the voltage "Vcc2" of the control part 14 are boosted and therefore the power driver 35 operates. The power driver 35 outputs the power-saving off signal through the inverter 37 so as to cut off the output of the idle power driver 20, so that the power driving part 10 operates with a voltage of the normal mode.

At the beginning of the normal mode, the control part 14, as shown in signals 40d and 40e of FIG. 4, outputs a load-on signal after outputting the power-saving off signal with a predetermined time lapse 40f, in order to connect the secondary coil 6 with the driving circuits. Then, the power driving part 10 supplies the voltage of the normal mode to the transformer.

The predetermined time lapse 40f between the power-saving off signal and the load-on signal outputted from the control part 14 is to stabilize the idle power driver 20 before the load is increased by the connection between the secondary coil 6 and the driving circuits, i.e., considering the idle power driver 20 is not stabilized against a load change. The voltage at the LOAD is shown as 40c in FIG. 4.

Furthermore, when the normal mode changes to the power saving mode, backwardly, the idle power driver 20 operates in the state that the load (driving components) is not connected to the secondary coil 6 by cutting off the power-saving off signal after cutting off a load-on signal at a predetermined interval 40g.

That is, in changing from the normal mode into the power saving mode, the load-on signal is cut off, so that the secondary coil 6 is not connected to the driving components. After cutting off the load-on signal, if the predetermine time interval 40g elapses, the power-saving off signal is cut off. By cutting off the power-saving off signal, the photocoupler 11a is turned off, so that the power-saving off transistor 11b is turned off. Then, electric power is supplied to the idle power driver 20, and then the feedback-cutoff transistor 11c is turned on, thereby dropping the feedback voltage supplied to the power driving part 10 into 0V.

If the feedback voltage is dropped into 0V, the operation of the power driver 35 is suspended. Further, if the electric power is supplied to the idle power driver 20, the first and second comparator 23 and 24 are operated, thus allowing the AND gate 25 to output the synthetic square wave signal. Thus, the power transistor 38 of the power driving part 10 outputs an AC signal to the primary coil 5 by being switched on/off according to the synthetic square wave signal, and to the control part 14 connected to the secondary coil 6 is applied a minimum driving voltage, i.e., the idle mode is begun.

With this configuration, at a power saving mode, power consumption of a power driving part is minimized, securing a stable operation of the power driving part and a control part connected to a secondary coil, and a noise is decreased by driving the transformer beyond an audible frequency band. Further, because a starting resistor is used in only starting an idle power driver, it is possible to increase the resistance of the starting resistor, and such increased resistance prevents a leakage current, thereby decreasing a leakage power.

As described above, the present invention provides a display apparatus having a power supply capable of minimizing power consumption at a power saving mode by driving a power driving part with a synthetic synchronous signal, securing a stable operation of a control part and the power driving part.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus having a power supply including a commercial AC power supplying part, a transformer having a primary coil and a secondary coil and supplying an AC voltage to driving circuits, and a feedback voltage sensing part sensing a load of the secondary coil, and comprising:

a power mode information part outputting information for determining a normal mode or a power saving mode according to an input of a synchronous signal;

a power driving part including a power driver generating a power regulating signal according to a synchronous signal on the basis of a feedback voltage sensed by the feedback voltage sensing part in the normal mode, and an idle power driver generating a power saving voltage on the basis of a synchronous signal which is made by synthesizing different frequency signals in the power saving mode;

an idle switching part turning on/off the idle power driver; and a control part cutting off the feedback voltage applied to the power driver and controlling the idle switching part so as to operate the idle power driver in the power saving mode.

2. The display apparatus according to claim 1, wherein the power driving part includes a power transistor connected to the primary coil, and the idle power driver includes a plurality of sawtooth generators respectively generating sawtooth signals of several tens of hertz and several tens of kilohertz, a plurality of comparators processing the sawtooth signals and outputting square wave signals having different pulse widths, and an AND gate logically synthesizing the square wave signals outputted from the comparators and supplying the synthetic square wave signal to the power transistor.

3. The display apparatus according to claim 2, further comprising an OR gate provided between the power driver and the power transistor, logically OR-ing output signals of the power driver and the idle power driver, and supplying the resultant signal to the power transistor.

4. The display apparatus according to claim 2, wherein the sawtooth generator generating the sawtooth signal of several tens of hertz is driven on the basis of the DC voltage of the primary coil, and the sawtooth generator generating the sawtooth signal of several tens of kilohertz is driven on the basis of the driving voltage of the power driving part.

5. The display apparatus according to claim 2, wherein the power driving part further includes an inverter provided between the power driver and the AND gate so as to suspend the operation of the idle power driver in the normal mode, and the power driving part outputs a power-saving off signal to the AND gate through the inverter when the power saving mode changes to the normal mode.

6. The display apparatus according to claim 4, wherein the idle switching part includes a photocoupler and a power-saving off transistor turned on together with the photocoupler and cutting off the DC voltage supplied to the comparator receiving the several tens of hertz sawtooth signal.

7. The display apparatus according to claim 6, wherein the power driving part further includes a feedback voltage regulating part transmitting a feedback regulating signal after comparing a voltage sensed by a sensing resistor with a feedback voltage sensed by the feedback voltage sensing part, and the idle switching part further includes a feedback-cutoff transistor operating contrary to the power-saving off transistor and cutting on/off the feedback voltage supplied to the feedback voltage regulating part.

8. The display apparatus according to claim 7, wherein the control part outputs a load-off signal for switching off a connection between the secondary coil and each driving circuit after operating the idle switching part after a predetermined time lapse at the beginning of the power saving mode.

9. The display apparatus according to claim 8, wherein the control part turns off the idle switching part after connecting the secondary coil with each driving circuit when the power saving mode changes to the normal mode.

10. The display apparatus according to claim 1, wherein the power mode information part includes a video card turning on/off the synchronous signal applied to the power driver according to the normal mode or the power saving mode.

11. A power supply for a display apparatus, comprising:
a power driving part receiving a synchronous signal and comprising:

a power driver generating a power regulating signal according to a synchronous signal on the basis of a feedback voltage sensed by a feedback voltage sensing part in a normal mode; and an idle power driver generating a power saving voltage on the basis of a synchronous signal which is made by synthesizing different frequency signals in the power saving mode;

an idle switching part, coupled to the power driving part, turning on/off the idle power driver; and a control part, coupled to the idle switching part, cutting off the feedback voltage applied to the power driver and controlling the idle switching part so as to operate the idle power driver in the power saving mode.

12. The power supply as in claim 11, wherein the power driving part comprises a power transistor connected to a primary coil of the power supply, and the idle power driver comprises:

a plurality of sawtooth generators respectively generating sawtooth signals;

a plurality of comparators processing the sawtooth signals and outputting square wave signals, each of the square wave signals having pulse widths different than the other of the square wave signals; and an AND gate logically synthesizing the square wave signals and transmitting the resultant, synthetic square wave signal to the power transistor.

13. The power supply as in claim 12, further comprising an OR gate provided between the power driver and the power transistor and logically OR-ing signals output by the power driver and the idle power driver, and supplying the resultant signals to the power transistor.

14. The power supply as in claim 12, wherein the sawtooth generator generating one of the sawtooth signals is driven on the basis of a DC voltage drop across the primary coil, and the sawtooth generator generating another of the sawtooth signals is driven on the basis of the driving voltage of the power driving part.

15. The power supply as in claim 12, wherein the power driving part further comprising an inverter provided between the power driver and the AND gate so as to suspend the operation of the idle power driver in the normal mode, and the power driving part outputs a power-saving off signal to the AND gate through the inverter when the power saving mode changes to a normal mode.

16. The power supply as in claim 14, wherein the idle switching part comprising a photocoupler and a power-saving off transistor turned on together with the photocoupler and cutting off the DC voltage supplied to the comparator receiving the one of the sawtooth signals.

17. The power supply according to claim 16, wherein the power driving part further comprising a feedback voltage regulating part transmitting a feedback regulating signal after comparing a voltage sensed by a sensing resistor with a feedback voltage sensed by the feedback voltage sensing part; and wherein the idle switching part further comprising a feedback-cutoff transistor operating opposite to the power-saving off transistor and cutting on/off the feedback voltage supplied to the feedback voltage regulating part.

18. The power supply according to claim 17, wherein the control part outputs a load-off signal for switching off a connection between a secondary coil and each of driving circuits after operating the idle switching part after a predetermined time lapse at the beginning of the power saving mode.

19. The power supply according to claim 18, wherein the control part turns off the idle switching part after connecting the secondary coil with each of the driving circuits when the power saving mode changes to a normal mode.

20. The power supply according to claim 11, wherein the synchronous signal is received from a video card.

21. A method of a power supply for a display apparatus, comprising:

receiving by a power driving part a synchronous signal;

generating by a power driver a power regulating signal according to a synchronous signal on the basis of a feedback voltage sensed by a feedback voltage sensing part in a normal mode;

cutting off the feedback voltage applied to the power driver in the power saving mode; and generating a power saving voltage on the basis of a synchronous signal which is made by synthesizing different frequency signals in the power saving mode.

22. The method according to claim 21, wherein generating the power saving voltage is performed by an idle power driver.

23. The method according to claim 22, wherein the idle power driver is turned off/on according to the normal mode and the power saving mode by an idle power switching part.

24. The method according to claim 23, wherein the operation of the idle power switching part is controlled by a control part.

25. The method according to claim 21, wherein the cutting off the feedback voltage is performed by the control part.

* * * * *